United States Patent
Hakoda et al.

(10) Patent No.: US 7,866,970 B2
(45) Date of Patent: Jan. 11, 2011

(54) HYDRAULIC DRIVE DEVICE FOR INJECTION MOLDING MACHINE

(75) Inventors: Takashi Hakoda, Nagano-ken (JP); Isamu Komamura, Nagano-ken (JP); Toshimi Kato, Nagano-ken (JP); Kiyoshi Nakamura, Nagano-ken (JP)

(73) Assignee: Nissei Plastic Industrial Co., Ltd., Nagano-Ken (JP)

( * ) Notice: Subject to any disclaimer, the term of this patent is extended or adjusted under 35 U.S.C. 154(b) by 83 days.

(21) Appl. No.: 12/424,950

(22) Filed: Apr. 16, 2009

(65) Prior Publication Data

US 2009/0263530 A1    Oct. 22, 2009

(30) Foreign Application Priority Data

Apr. 18, 2008   (JP) .............................. 2008-108798

(51) Int. Cl.
    *B29C 45/77*    (2006.01)
(52) U.S. Cl. ...................................... 425/145; 425/149
(58) Field of Classification Search ................. 425/145, 425/149, 150

See application file for complete search history.

(56) References Cited

U.S. PATENT DOCUMENTS 5,688,535 A  *  11/1997  Koda et al. .................. 425/145

FOREIGN PATENT DOCUMENTS

| JP | 62-17401 | * | 1/1987 |
| JP | 7-110078 A | | 4/1995 |
| JP | 2665815 B2 | | 10/1997 |

* cited by examiner

*Primary Examiner*—Tim Heitbrink
(74) *Attorney, Agent, or Firm*—Birch, Stewart, Kolasch & Birch, LLP

(57) ABSTRACT

In a hydraulic drive device (1) for an injection molding machine (M) that has a pressure control valve (Vs) incorporating a pressure sensor (2) for detecting a hydraulic pressure and a feedback control circuit (Cs) for controlling the hydraulic pressure by feedback based on a pressure detection value (Spd) obtained from the pressure sensor (2) and a pressure instruction value (Spc) fed from a molding machine controller (3), the molding machine controller (3) includes a second feedback control circuit (Cm) for correcting the pressure instruction value (Spc) that is fed to the pressure control valve (Vs) based on the pressure detection value (Spd) fed from the pressure control valve (Vs) and the pressure instruction value (Spci) obtained from the interior of the molding machine controller (3).

10 Claims, 4 Drawing Sheets

HYDRAULIC DRIVE DEVICE FOR INJECTION MOLDING MACHINE

TECHNICAL FIELD

The present invention relates to a hydraulic drive device for an injection molding machine, provided with a feedback control circuit for controlling hydraulic pressure by feedback and a pressure control valve.

BACKGROUND ART

Hydraulic injection molding machines generally have a hydraulic drive device. This hydraulic drive device is provided with: a screw drive portion having an injection cylinder for moving a screw in an injection device forward or backward and an oil motor for rotating the screw; and a hydraulic drive portion for driving this screw drive portion. The hydraulic drive device is also provided with back pressure control means for applying a predetermined amount of a back pressure to the screw at the time of measurement when the screw is moved back or at the time of a sack back process. As this back pressure control means, a pressure control valve is used that is connected to the rear oil compartment of the injection cylinder. In this case, when the back pressure is applied, the back pressure (hydraulic pressure) is detected by a pressure sensor, and the pressure control valve connected to the rear oil compartment of the injection cylinder is controlled by feedback such that the back pressure detected reaches a predetermined target value. Thus, a molding machine controller is provided with a feedback control circuit for controlling such a back pressure by feedback (see patent document 1 for example).

A control valve is also known in which such a feedback control circuit is integrally fitted to a pressure control valve and this facilitates adjustment of an electrical system when the pressure control valve is used and achieves high-speed response. In patent document 2, there is disclosed a proportional solenoid control valve device including an oil immersion electromagnetic solenoid plunger device that produces a mechanical output proportional to an excitation current at a movable portion, a fluid control valve device that controls the pressure or the amount of fluid by being displaced by the mechanical output through a spring force and a current driver device that feeds, as the excitation current, an output current corresponding to a previously applied input signal to the electromagnetic solenoid plunger device, in which the movable portion of the solenoid plunger device is formed with a movable element showing substantially no damping characteristic when it moves within oil and in which the current driver device is provided with a current control circuit, in a feedback system, that limits the increase of the excitation current so as to prevent vibrations caused when the movement of the movable element is stopped as the excitation current rises.

SUMMARY OF INVENTION

Technical Problem

However, a conventional hydraulic drive device using the above-described pressure control valve (proportional solenoid control valve device) suffers from the following problem that needs to be solved.

Specifically, a molding machine controller and a pressure control valve are generally located away from each other in different environments, and thus a slight potential difference [about few tens of millivolts (mV)] between the internal potential of a circuit of an electrical system included in the pressure control valve and the internal potential of the molding machine controller may be produced. In this case, since a high pressure of about 15 (Mpa) is generally produced as an injection pressure, a mold clamping pressure or the like, even if such a potential difference (of an offset level) is produced, there is little problem; however, when a low pressure of about 0.5 (MPa) is generally produced as a back pressure, the production of such a potential difference of an offset level is not negligible as an error factor. Thus, it is impossible to achieve back pressure control accurately and stably; in particular, as the back pressure decreases, this effect becomes more significant.

Solution to Problem

To overcome the forgoing problem, according to the present invention, there is provided a hydraulic drive device 1 for an injection molding machine M that has a pressure control valve Vs incorporating a pressure sensor 2 for detecting a hydraulic pressure and a feedback control circuit Cs for controlling the hydraulic pressure by feedback based on a pressure detection value Spd obtained from the pressure sensor 2 and a pressure instruction value Spc fed from a molding machine controller 3, in which the molding machine controller 3 includes a second feedback control circuit Cm for correcting the pressure instruction value serving as an output instruction value Spc that is fed to the pressure control valve Vs based on the pressure detection value Spd fed from the pressure control valve Vs and the pressure instruction value Spci obtained from the interior of the molding machine controller 3.

ADVANTAGEOUS EFFECTS OF INVENTION

A hydraulic drive device 1 for an injection molding machine configured as described above and according to the present invention provides the following remarkable benefits.

(1) Since the molding machine controller 3 has a second feedback control circuit Cm that corrects an output instruction value Spc that is fed to a pressure control valve Vs based on a pressure detection value Spd fed from the pressure control valve Vs and a formal instruction value Spci obtained from the interior of the molding machine controller 3, it is possible to eliminate an error produced between the formal instruction value Spci and the output instruction value Spc before correction. Thus, it is possible to realize pressure control accurately and stably, irrespective of the magnitude of the pressure instruction value Spc (hydraulic pressure) for use in pressure control, even if the pressure instruction value Spc is low.

(2) When, in a preferred embodiment, as the hydraulic pressure, a back pressure produced in the rear oil compartment 12r of an injection cylinder 12 at the time of the backward movement of a screw 11 in an injection device Mi is used, for example, it is possible to realize pressure control accurately and stably even if a relatively low pressure of about 0.5 (MPa) is generally produced as a back pressure.

(3) When, in a preferred embodiment, as the pressure detection value Spd, the pressure detection value Spd corrected according to an oil temperature detected by a temperature sensor 13 disposed in a pressure sensor 2 itself or near the pressure sensor 2 is used, it is possible to realize pressure control accurately and stably without being affected by variations (temperature drift) in the oil temperature.

(4) When, in a preferred embodiment, the pressure control valve Vs has a separate connection port 14s that is not connected to an inlet port 14i and an outlet port 14o for operation oil, the pressure sensor 2 faces an oil passage 15 communicating with the connection port 14s and the connection port 14s and the rear oil compartment 12r of the injection cylinder 12 are connected together, it is possible to directly detect, with the pressure sensor 2, the hydraulic pressure (back pressure) of the rear oil compartment 12r of the injection cylinder 12. This makes it possible to control the back pressure by feedback with high accuracy and to reduce the number of pressure sensors incorporated in the injection cylinder 12.

(5) When, in a preferred embodiment, the second feedback control circuit Cm has a correction function of determining a deviation Ep between the pressure detection value Spd and the formal instruction value Spci and of obtaining the output instruction value Spc by adding the deviation Ep to the formal instruction value Spci, it is possible to practice the present invention easily and inexpensively with a relatively simplified configuration.

(6) When, in a preferred embodiment, the hydraulic drive device 1 has a hydraulic pump portion 17 for variably controlling the number of rotations of a drive motor 16 to control at least a discharge flow, it is possible to practice the hydraulic drive device 1 of the present invention in an optimum form and realize it as a highly feasible embodiment. Moreover, by control of an inverter for a pump main body, energy can be further saved and running cost can be reduced.

(7) When, in a preferred embodiment, the hydraulic drive device 1 has an oil motor 18 for rotating a screw 11 and an injection device Mi having a rotary encoder 19 for detecting the number of rotations of the oil motor 18, and the molding machine controller 3 has a third feedback control circuit Cr that variably controls the number of rotations of the drive motor 16 based on the number of rotations (a rotation number detection value Rd) detected by the rotary encoder 19 and a preset rotation number set value Rs, it is possible to enhance the responsivity to the rotation of the screw 11, for example, to make the number of rotations of the screw 11 quickly reach the target number of rotations. Consequently, it is possible to produce a desired effect on the control of back pressure by the use of pressure control valve Vs, and this makes it possible to control back pressure stably and accurately.

DESCRIPTION OF EMBODIMENTS

A preferred embodiment of the present invention will now be described in detail based on the accompanying drawings.

The accompanying drawings do not limit the present invention but facilitates understanding of the present invention. Known parts will not be described in detail in order to prevent unclear description from being presented.

A description will first be given of the configuration of a hydraulic drive device 1 of this embodiment and the schematic configuration of an injection molding machine M incorporating the hydraulic drive device 1 with reference to FIGS. 1 and 2.

Figure 2:
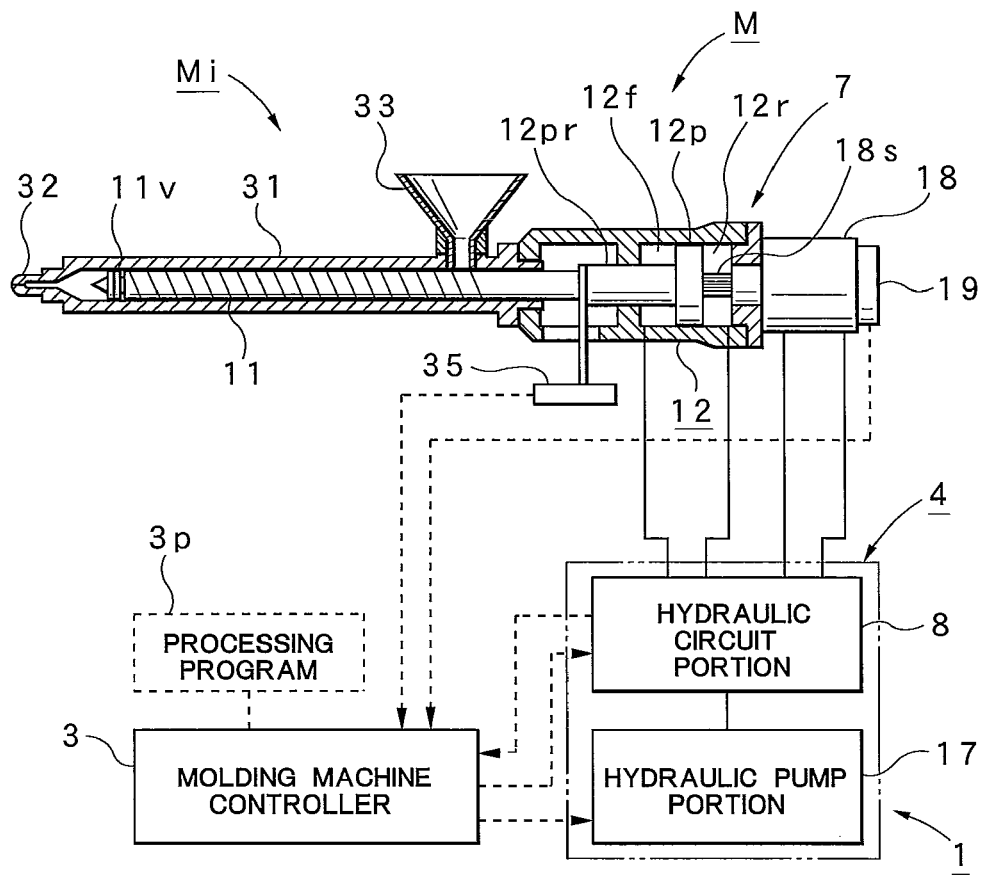
FIG. 2 is a diagram schematically showing the configuration of the injection molding machine incorporating the hydraulic drive device.

In FIG. 2, the reference numeral M represents the hydraulic injection molding machine, and particularly represents an injection device Mi without the illustration of a mold clamping device. The injection device Mi has a screw drive portion 7 that is disposed in its rear portion and a heating cylinder 31 that is integrally fitted to a front portion of the screw drive portion 7. The heating cylinder 31 has an injection nozzle 32 in its front end and a hopper 33 in its rear portion. The heating cylinder 31 incorporates a screw 11 that has a ring valve (a backflow prevention valve) 11v in a front portion of the screw 11. The screw drive portion 7 has an injection cylinder 12 and an oil motor 18 that is disposed on the rear end of the injection cylinder 12. The injection cylinder 12 incorporates a piston 12p of one-rod type; a one-rod portion 12pr protruding from the piston 12p protrudes forward from a front end of a cylinder main body and couples to the rear end of the screw 11. Hence, the interior of the injection cylinder 12 is divided by the piston 12p into a front oil compartment 12f and a rear oil compartment 12r. Meanwhile, the drive shaft 18s of the oil motor 18 is spline-coupled to the rear end of the piston 12p. The oil motor 18 that can rotate normally and reversely is used. Thus, the injection cylinder 12 can press (transfer) the screw 11 forward and backward, and the oil motor 18 can rotate the screw 11 normally and reversely.

A hydraulic drive portion 4 is connected to the screw drive portion 7. The hydraulic drive portion 4 has a hydraulic circuit portion 8 and a hydraulic pump portion 17 connected to the hydraulic circuit portion 8; such hydraulic circuit portion 8 and hydraulic pump portion 17 are controlled by a molding machine controller 3. In this case, the molding machine controller 3 has the function of controlling the entire molding machine, performs various sequence controls (process control), communication control and the like by the use of a processing program 3p stored therein and has the function of performing various types of data processing such as computation processing and storage processing. In FIG. 2, the reference numeral 35 represents a position sensor using a linear scale that directly detects the position of the screw 11 (screw position), and the reference numeral 19 represents a rotary encoder that directly detects the number of rotations of or the angle of rotation of the oil motor 18 when it rotates normally and reversely. These position sensor 35 and rotary encoder 19 are attached to the molding machine controller 3, and are connected to the input port of the molding machine controller 3. The screw drive portion 7, the hydraulic drive portion 4 (the hydraulic circuit portion 8 and the hydraulic pump portion 17) and the molding machine controller 3 described above constitute the hydraulic drive device 1 of this embodiment.

Figure 1:
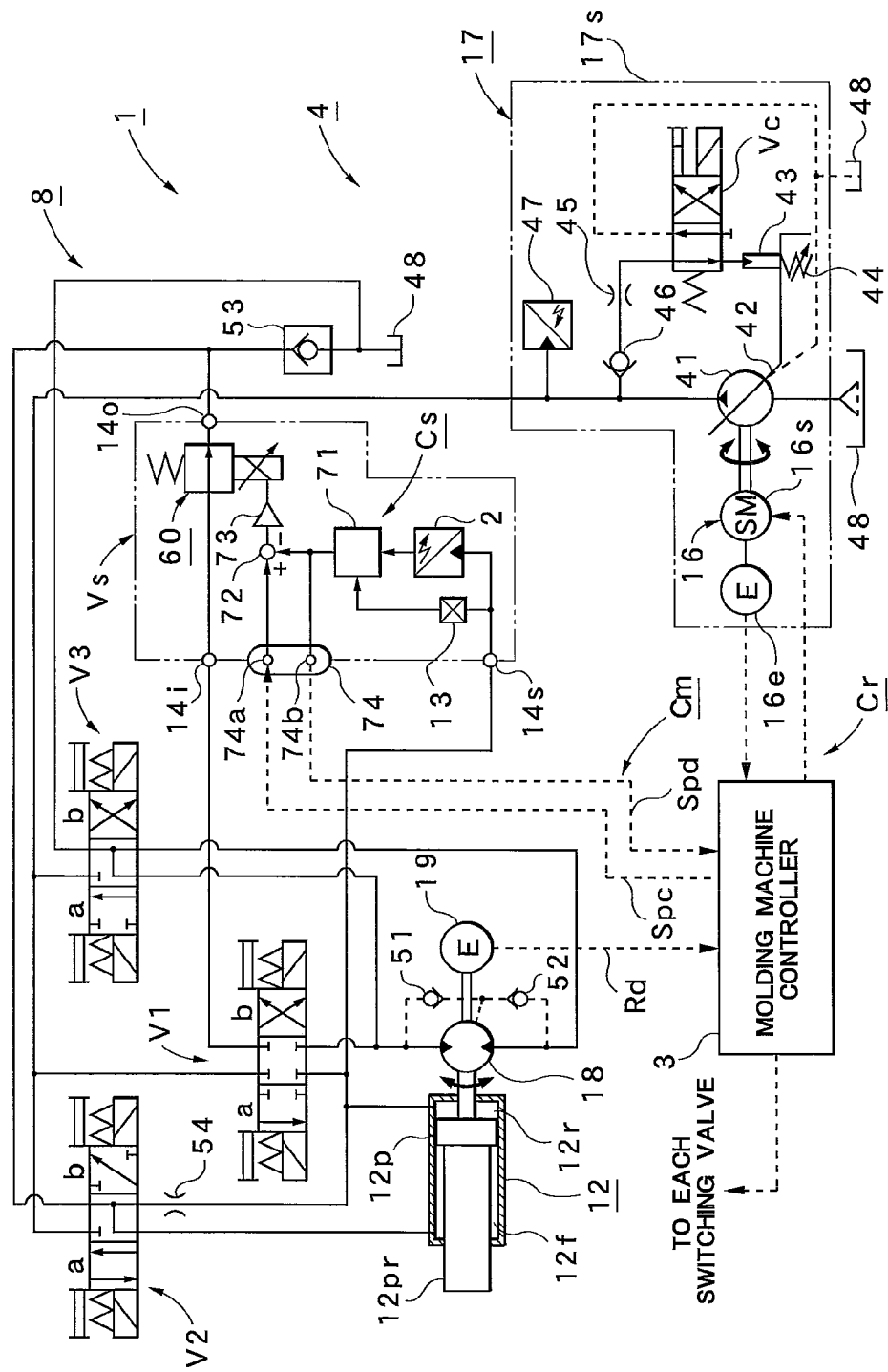
FIG. 1 is a circuit diagram of a hydraulic system and a control system of a hydraulic drive device of an injection molding machine according to a preferred embodiment of the present invention.

FIG. 1 shows an example of a circuit diagram that more specifically shows the hydraulic system and the control system of the hydraulic drive device 1. In FIG. 1, such parts are also found in FIG. 2 which and identified with the common reference numerals so that the configuration is clearly illustrated.

As for the hydraulic pump portion 17, a variable discharge hydraulic pump 17s serving as a hydraulic drive source is used. The variable discharge hydraulic pump 17s has a pump main body 41 and a servo motor 16s (a drive motor 16) that rotates and drives the pump main body 41. The variable discharge hydraulic pump 17s variably controls the number of rotations of the servo motor 16s to control at least the discharge flow. As for the servo motor 16s, an alternating-current servo motor connected to the output port of the molding machine controller 3 is used. A rotary encoder 16e that detects the number of rotations of the servo motor 16s is attached to the servo motor 16s; this rotary encoder 16e is connected to the input port of the molding machine controller 3. The pump main body 41 is formed with an inclined-plate piston pump. Thus, the pump main body 41 has an inclined plate 42, and as the inclination angle of the inclined plate 42 (an inclined-plate angle) is increased, the stroke of the pump piston of the pump main body 41 is increased, with the result that the discharge flow is increased; as the inclined-plate angle is decreased, the stroke of the pump piston is decreased, with the result that the discharge flow is decreased. Hence, by setting the inclined-plate angle at a predetermined angle, it is possible to set a fixed discharge flow such that the discharge flow is fixed to a predetermined amount. A control cylinder 43 and a return spring 44 are attached to the inclined plate 42; the control cylinder 43 is connected to the discharge port of the pump main body 41 through a switching valve (an electromagnetic valve) Vc, an aperture 45 and a backflow prevention valve 46. In this way, by controlling the control cylinder 43, it is possible to vary the angle of the inclined plate 42 (the inclined-plate angle). The reference numeral 47 represents a pump pressure sensor. As described above, in the hydraulic pump portion 17, the variable discharge hydraulic pump 17s that variably controls the number of rotations of the servo motor 16s to control at least the discharge flow is used, and this allows the hydraulic drive device 1 of the present invention to be practiced in an optimum form and provided as a highly feasible embodiment. Moreover, advantageously, by control of an inverter for the pump main body, energy can be further saved and running cost can be reduced. The inlet port of the pump main body 41 is connected to an oil tank 48; the discharge port of the pump main body 41 is connected to the hydraulic circuit portion 8.

The hydraulic circuit portion 8 has a first-direction switching valve (an electromagnetic valve) V1, a second-direction switching valve (an electromagnetic valve) V2, an additional switching valve (an electromagnetic valve) V3 and a pressure control valve (a back pressure control valve) Vs; the hydraulic circuit portion 8 is configured by connecting them as shown in FIG. 1. The reference numerals 51, 52 and 53 represent backflow prevention valves; the reference numeral 54 represents an aperture. Thus, the hydraulic circuit portion 8 has not only two switching valves V1 and V2 for performing switching operations other than rotating the oil motor 18 reversely but also the additional switching valve V3 for connecting to the oil motor 18 to rotate it reversely. By adopting such a configuration, since the addition of one switching valve allows the screw 11 to be rotated reversely in the hydraulic drive portion, it is possible to achieve it advantageously and easily with a relatively simplified configuration. The pressure control valve Vs is configured as a unit that can control back pressure when the screw 11 is moved backward and that can control, with a pressure sensor 2, the back pressure by minor-loop feedback (closed-loop feedback). Thus, with such a pressure control valve Vs, it is possible to perform a measuring process more accurately and stably.

Since the pressure control valve Vs is a major portion of the hydraulic drive device 1 of this embodiment, the configuration and operation (function) of the pressure control valve Vs and its peripheral circuit will be described below with reference to FIGS. 1 to 7.

Figure 4:
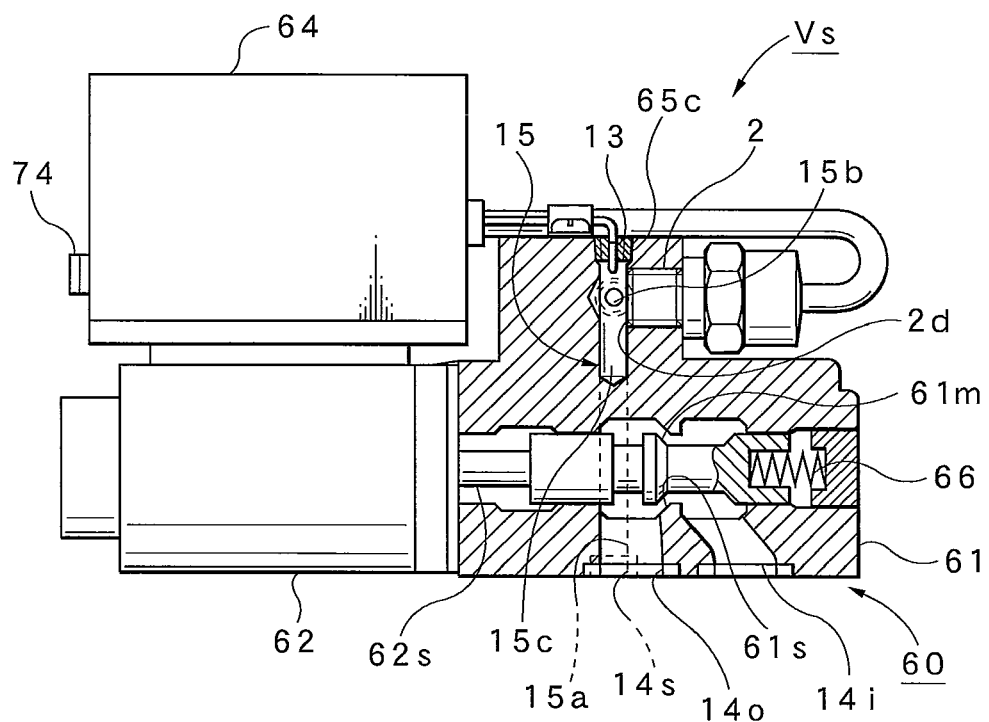
FIG. 4 is a partly cross-sectional side view of a pressure control valve used in the hydraulic drive device.
Figure 5:
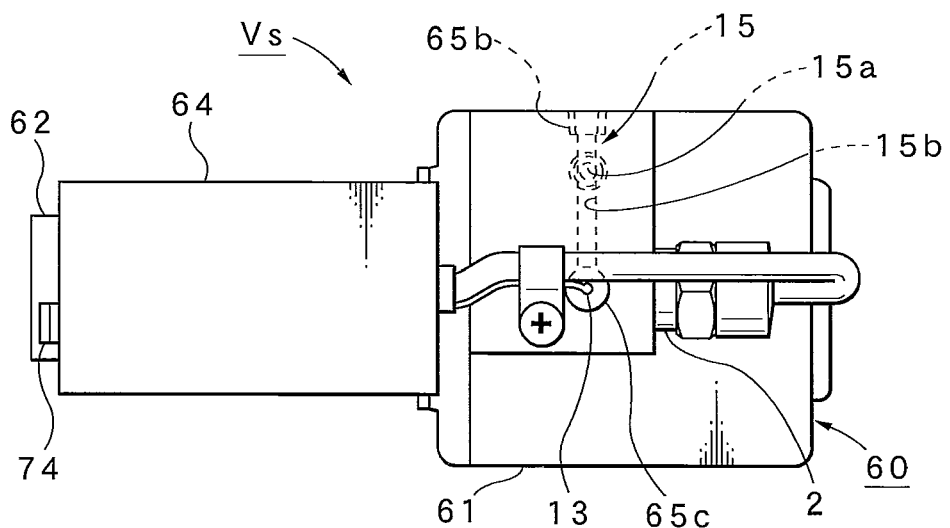
FIG. 5 is a plan view of the pressure control valve.

FIGS. 4 and 5 show the specific structure of the pressure control valve Vs. This pressure control valve Vs has a valve mechanism portion 60 constituting a basic control valve including a valve body 61 and an electromagnetic solenoid 62 and also has the pressure sensor 2, a temperature sensor 13 and a circuit box 64. The valve body 61 forms a valve seat portion 61s inside it and incorporates a valve member 61m that freely moves forward and backward as the valve seat portion 61s moves. The valve member 61m is coupled to the armature 62s of the electromagnetic solenoid 62, and the valve seat portion 61s communicates with both an inlet port 14i for operation oil on the upstream side and an outlet port 14o for operation oil on the downstream side. The reference numeral 66 represents a spring that applies a force to the valve member 61m in a direction in which it is returned.

The pressure sensor 2 is screwed into the outside of the valve body 61 such that a pressure detecting surface 2d formed in the end of the pressure sensor 2 faces an oil passage 15 disposed inside the valve body 61. The illustrated oil passage 15 is composed of a third straight oil passage 15c opposite the pressure detecting surface 2d, a second straight oil passage 15b that communicates with the third straight oil passage 15c and a first straight oil passage 15a that communicates with the second straight oil passage 15b. The outside end of the first straight oil passage 15a serves as a connection port 14s that opens to the outside surface of the valve body 61. The openings of the second straight oil passage 15b and the third straight oil passage 15c opposite the outside surface of the valve body 61 are blocked by screwing blocking caps 65b and 65c. In this case, the blocking cap 65c also serves as a member for attaching the temperature sensor 13. Specifically, the temperature sensor 13 is attached to the center of the blocking cap 65c so as to penetrate through the blocking cap 65c, with the result that, when the blocking cap 65c is screwed into the third straight oil passage 15c, an end detection portion of the temperature sensor 13 faces the interior of the third straight oil passage 15c. In this way, the temperature sensor 13 can detect the temperature of the operation oil near the pressure detecting surface 2d as shown in FIG. 4.

The temperature sensor 13 and the pressure sensor 2 are connected to the circuit box 64. This circuit box 64 incorporates the circuit of the electrical system shown in FIG. 1, namely, a signal processing portion 71, a computation portion 72 and an amplification portion 73. A minor-loop feedback control circuit Cs is configured by connecting the temperature sensor 13 and the pressure sensor 2 to the signal processing portion 71. The reference numeral 74 represents a connector, disposed on the circuit box 64, that has an input terminal 74a and an output terminal 74b. This minor-loop feedback control circuit Cs operates (functions) as follows. First, the signal processing portion 71 has the function of correcting an output signal of the pressure sensor 2 according mainly to the detection result (oil temperature) by the temperature sensor 13. Hence, the output signal of the pressure sensor 2 and the output signal of the temperature sensor 13 are fed to the signal processing portion 71, and thus the temperature-corrected output signal (pressure detection value) Spd of the pressure sensor 2 is obtained, and then the pressure detection value Spd is input to the inverting input portion of the computation portion 72. By using, as the pressure detection value Spd, the pressure detection value Spd corrected according to the oil temperature detected by the temperature sensor 13 disposed near the pressure sensor 2 in this way, it is possible to realize pressure control accurately and stably without being affected by variations (temperature drift) in the oil temperature. On the other hand, an instruction signal for back pressure (a pressure instruction value) Spc is fed from the molding machine controller 3, and this pressure instruction value Spc is input through the input terminal 74a to the non-inverting input portion of the computation portion 72. Thus, a control signal based on the deviation between the pressure instruction value Spc and the pressure detection value Spd is obtained from the output portion of the computation portion 72, and this control signal is fed through the amplification portion 73 to the electromagnetic solenoid 62. Specifically, the position of the valve member 61m in its axial direction is variably controlled by the control signal, with the result that the back pressure is controlled by minor-loop feedback such that the pressure detection value Spd equals the pressure instruction value Spc.

Incidentally, a pressure sensor 2 for a conventional pressure control valve Vs having a minor-loop feedback control circuit Cs is generally fitted to detect the pressure of oil within an inlet port 14i. That is, an oil passage 15 described above communicates with the inlet port 14i without facing the outside surface of the valve body 61. However, in the pressure control valve Vs of this embodiment, the oil passage 15 is not connected to the inlet port 14i; the use of the end of the oil passage 15 as the connection port 14s allows the pressure of oil outside to be detected. Thus, in this embodiment, as shown in FIG. 1, the connection port 14s is connected through an external oil feed pipe to the rear oil compartment 12r of the injection cylinder 12, and this allows back pressure produced in the rear oil compartment 12r of the injection cylinder 12 to be directly detected. This makes it possible to control back pressure by minor-loop feedback with high accuracy. A pressure sensor for another purpose that is attached to the injection cylinder 12 can be also used for this purpose, and this advantageously reduces the number of pressure sensors.

As will also be clear from FIG. 1, since the pressure control valve Vs is generally connected to the downstream side of the first-direction switching valve V1, it is difficult for the pressure control valve Vs incorporating the pressure sensor 2 to directly detect, with the pressure sensor 2, the back pressure in the rear oil compartment 12r of the injection cylinder 12. Consequently, it is impossible to control back pressure accurately. Naturally, even when the pressure control valve Vs of this embodiment is used, the connection of the inlet port 14i and the connection port 14s with an optional oil feed pipe or the like as appropriate allows it to be also used as a pressure control valve Vs of conventional configuration.

Figure 3:
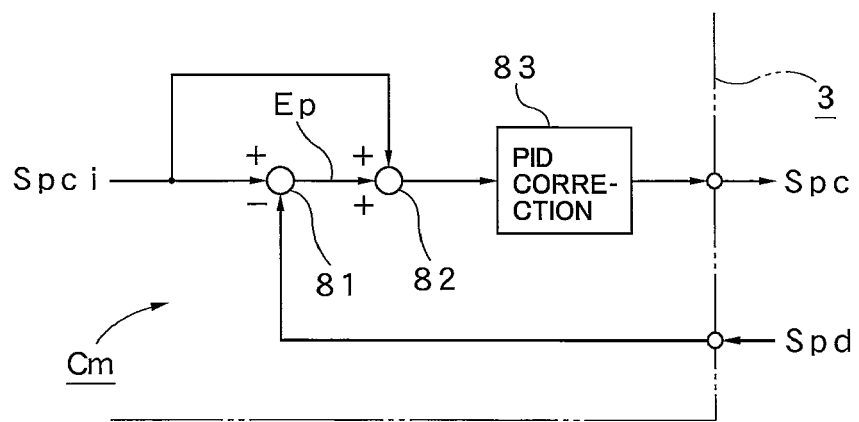
FIG. 3 is a circuit diagram of a second feedback control circuit included in the hydraulic drive device.

The pressure control valve Vs is provided with a second feedback control system (a closed-loop control system) for back pressure. Specifically, the pressure control valve Vs is provided with a second feedback control circuit Cm in which the temperature-corrected pressure detection value Spd output from the signal processing portion 71 of the pressure control valve Vs is fed through the output terminal 74b to the molding machine controller 3, the pressure instruction value Spc is corrected by the molding machine controller 3 based on the magnitude of the pressure detection value Spd and the pressure instruction value Spc thus corrected is fed to the input terminal 74a of the pressure control valve Vs. FIG. 3 shows a functional block diagram of the second feedback control circuit Cm in the molding machine controller 3. In FIG. 3, the reference numeral 81 represents a computation portion for determining the deviation Ep between the pressure detection value Spd fed from the pressure control valve Vs and a pressure instruction value (a formal instruction value) Spci obtained from the interior of the molding machine controller 3, the reference numeral 82 represents an addition portion that obtains the pressure instruction value (an output instruction value) Spc obtained by adding the deviation Ep to the formal instruction value Spci and fed to the pressure control valve Vs and the reference numeral 83 represents a PID correction portion that corrects the pressure instruction value Spc with a PID constant to output it to the pressure control valve Vs.

This feedback control circuit Cm is provided for the following reason. As described previously, the molding machine controller 3 and the pressure control valve Vs are generally located away from each other in different environments, and thus a slight potential difference [about few tens of millivolts (mV)] between the internal potential of a circuit of an electrical system included in the pressure control valve Vs and the internal potential of the molding machine controller 3 may be produced. In this case, since a high pressure of about 15 (Mpa) is generally produced as an injection pressure, a mold clamping pressure or the like, even if such a potential difference (of an offset level) is produced, there is little problem; however, when a low pressure of about 0.5 (MPa) is generally produced as a back pressure, the production of such a potential difference of an offset level is not negligible as an error factor. To overcome such a problem, the second feedback control circuit Cm for correcting the pressure instruction value Spc that is fed to the pressure control valve Vs according to the pressure detection value Spd and the formal instruction value Spci is provided in the molding machine controller 3 to eliminate an error produced between the formal instruction value Spci and the pressure instruction value Spc.

This feedback control circuit Cm operates (functions) as follows. The pressure detection value Spd output from the pressure control valve Vs is first fed to the inverting input portion of the computation portion 81, and the formal instruction value Spci obtained from the interior of the molding machine controller 3 is the non-inverting input portion of the computation portion 81. Thus, the deviation Ep between the pressure detection value Spd and the formal instruction value Spci is obtained at the output portion of the computation portion 81, and this deviation Ep is fed to one input portion of the addition portion 82. The formal instruction value Spci is fed to the other input portion of the addition portion 82, with the result that the pressure instruction value Spc obtained by adding the formal instruction value Spci to the deviation Ep is obtained from the output portion of the addition portion 82. Then, this pressure instruction value Spc is corrected by the PID correction portion 83 that sets the PID constant, and the PID-corrected output instruction value (pressure instruction value) Spc is fed to the pressure control valve Vs. Therefore, for example, when the pressure detection value Spd is lower than the formal pressure instruction value Spci, the deviation Ep therebetween is added to the formal instruction value Spci, and the pressure instruction value (output instruction value) Spc thus obtained is fed to the pressure control valve Vs, with the result that the pressure detection value Spd is constantly controlled by feedback so as to be equal in magnitude to the formal instruction value Spci.

Thus, by providing such a feedback control circuit Cm, it is possible to realize pressure control accurately and stably, irrespective of the magnitude of the pressure instruction value Spc (hydraulic pressure) for use in pressure control, even if the pressure instruction value Spc is low. In particular, when it is applied to the back pressure produced in the rear oil compartment 12r of the injection cylinder 12 at the time of the backward movement of the screw 11, for example, even if a relatively low pressure of about 0.5 (MPa) is generally produced as a back pressure, it is possible to realize pressure control accurately and stably. Advantageously, it is possible to provide this feedback control circuit Cm easily and inexpensively with a relatively simplified configuration.

Figure 6:
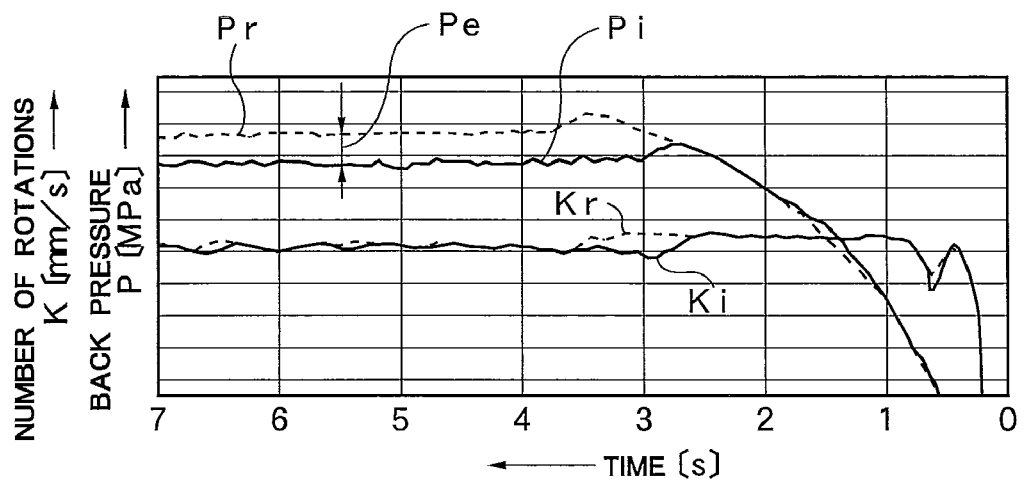
FIG. 6 is a graph showing, when a screw is rotated, variation data between its rotational speed and a back pressure with respect to time.

FIG. 6 shows, when the screw 11 is rotated, variation data between its rotational speed K (mm/s) and a back pressure P (Mpa) with respect to time (s), in which a rotational speed Ki and a back pressure Pi are obtained when the feedback control circuit Cm is used and a rotational speed Kr and a back pressure Pr are obtained when the feedback control circuit Cm is not used. In FIG. 6, the symbol Pe represents a pressure deviation caused by an error factor based on an offset level between the molding machine controller 3 and the pressure control valve Vs. When the feedback control circuit Cm is not used, an error corresponding to the pressure deviation Pe is included; when the feedback control circuit Cm is used, it is possible to effectively eliminate an error corresponding to the pressure deviation Pe. Consequently, it is possible to reach a target value.

Moreover, as shown in FIG. 1, the rotary encoder 19 is connected to the molding machine controller 3 to obtain the number of rotations (a rotation number detection value Rd) of the oil motor 18, and thus a third feedback control circuit Cr is provided that variably controls the number of rotations of the servo motor 16s based on the rotation number detection value Rd and a preset rotation number set value Rs. This makes it possible to immediately reflect the state of rotation of the screw 11 rotated by the oil motor 18 on the control of the hydraulic pump portion 17, with the result that the responsivity to the rotation of the screw 11 can be enhanced, for example, the number of rotations of the screw 11 can be increased to the target number of rotation. In particular, the combination with the above-described pressure control valve Vs produces a desired effect on the control of back pressure, and this makes it possible to control back pressure stably and accurately.

Figure 7:
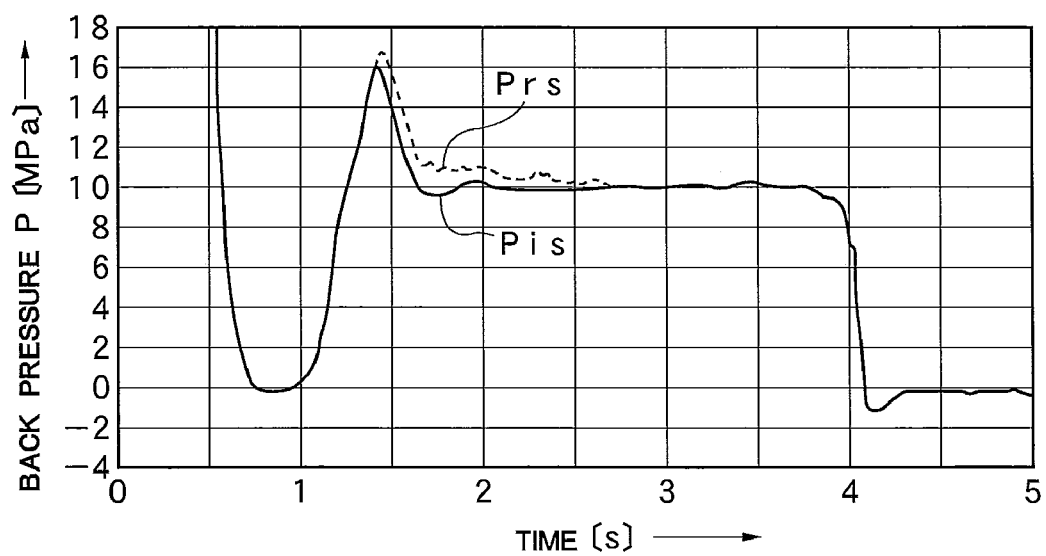
FIG. 7 is a graph showing variation data on the back pressure with respect to time in a measuring process.

FIG. 7 shows variation data on a back pressure P (Mpa) with respect to time (s) in a measuring process, in which the symbol Pis represents the back pressure when the feedback control circuits Cm and Cr is used and the symbol Prs represents the back pressure when the feedback control circuits Cm and Cr is not used. Since the use of the feedback control circuits Cm and Cr allows the back pressure to be stably and responsively controlled by the pressure control valve Vs, it is possible to quickly reach a target value of 10 (Mpa). However, when the feedback control circuits Cm and Cr are not used, a delay of about 1(s) occurs in the case of the illustrated example.

The overall operation (function) of the hydraulic drive device 1 of this embodiment and specifically the operation on the pressure control valve Vs will now be described with reference to the relevant drawings.

Here, it is assumed that the measuring process is being performed. In this case, the switching valves V1 and V2 in the hydraulic circuit portion 8 shown in FIG. 1 are switched to symbol "b" and the switching valve V3 is switched to symbol "a". The switching valve Vc is kept in the position shown in FIG. 1. Thus, the operation oil for the variable discharge hydraulic pump 17s is measured by rotating the oil motor 18 normally, that is, rotating the screw 11 normally. In this case, plasticized and molten resin is accumulated in front of the screw 11 inside the heating cylinder 31 so as to be measured, and the screw 11 moves backward accordingly. As the screw 11 moves backward, the operation oil in the rear oil compartment 12r of the injection cylinder 12 is discharged and is then returned through the pressure control valve Vs to the oil tank 48. Therefore, when the screw 11 moves backward, the back pressure is controlled by the pressure control valve Vs.

As described above, the back pressure is controlled by minor-loop feedback with the feedback control circuit Cs included in the pressure control valve Vs and is also controlled by feedback (closed-loop feedback) with the second feedback control circuit Cm through the molding machine controller 3 incorporated in the pressure control valve Vs. In other words, with the double feedback control systems, the back pressure is controlled highly accurately and stably. In addition, the third feedback control circuit Cr incorporated in the servo motor 16s is provided, with the result that the back pressure is stably and accurately controlled by the pressure control valve Vs.

The measurement process proceeds, and then, when the screw 11 reaches a preset position where the measurement is completed, the switching valve V1 is switched to a neutral position to stop the rotation of the screw 11, and a reverse rotation process of switching the switching valve V3 to symbol "b" to rotate the oil motor 18 reversely and a pressure application process of switching the switching valves V1 and V3 together to symbol "a" to apply pressure to the screw 11 in the forward direction are repeated at least one time and preferably two times. Thus, it is possible to accurately close, even when a hydraulic drive portion is used, the ring valve 11v of the screw 11 and to reduce variations in resin pressure and further variations in the amount of resin measured on a shot-by-shot basis to achieve high accuracy.

When the pressure application process, which is the last process, is completed, the switching valve V1 is switched to the neutral position, and the switching valve V2 is switched to symbol "a", with the result that a sack back process of moving the screw 11 backward is performed. In the sack back process, the screw 11 is moved backward by a preset stroke (for example, about 1 to 2 mm). In this case, the screw 11 is moved backward at such a relatively low speed that, when it is moved backward, the ring valve 11v is not opened. This makes it possible to avoid a problem in which, since the screw 11 is moved backward too fast, the ring valve 11v is opened. Such low-speed backward movement is achieved by the control of the pressure control valve Vs. After the screw 11 is moved backward by the predetermined stroke, the switching valve V2 is switched to symbol "b", and thus the operation proceeds to a standby state for an injection process. Thereafter, when the time to start the injection is reached, the injection process is performed.

Although the preferred embodiment is described in detail above, the present invention is not limited to this embodiment, and the detailed configuration, the shape, the number, the value, the method and the like can be freely modified, added or removed without departing from the spirit of the invention. For example, although the above description deals with the case where the back pressure produced in the rear oil compartment 12r of the injection cylinder 12 when the screw 11 in the injection device Mi is moved backward is controlled by the pressure control valve Vs, the hydraulic drive device 1 of the present invention can be equally applied to a case where any other pressure (hydraulic pressure) is controlled by the pressure control valve Vs. Although the above description deals with the example case where the temperature sensor 13 is disposed near the pressure sensor 2, the temperature sensor 13 may be disposed in the pressure sensor 2 itself. Although the above description deals with the case where, as the hydraulic drive portion 4, a hydraulic drive portion having the hydraulic pump portion 17 that variably varies the number of rotations of the drive motor 16 to control at least the discharge flow is illustrated, any other hydraulic pump portion such as a hydraulic pump portion combining a fixed discharge pump and a flow control valve may be used instead. The hydraulic circuit portion 8 is not limited to the illustrated circuit configuration, and any other circuit configuration having the same function may be used instead.

INDUSTRIAL APPLICABILITY

A hydraulic drive device of the present invention can be utilized in various injection molding machines having a pressure control valve incorporating a feedback control circuit that controls hydraulic pressure by feedback.

REFERENCE SIGNS LIST

1: Hydraulic drive device, 2: Pressure sensor, 3: Molding machine controller, 11: Screw, 12: Injection cylinder, 12r: Rear oil compartment of the injection cylinder, 13: Temperature sensor, 14i: Inlet port, 14o: Outlet port, 14s: Connection port, 15: Oil passage, 16: Drive motor, 17: Hydraulic pump portion, 18: Oil motor, 19: Rotary encoder, Spd: Pressure detection value, Spc: Output instruction value (pressure instruction value), Spci: Formal instruction value (pressure instruction value), Cs: Feedback control circuit, Cm: Second feedback control circuit, Cr: Third feedback control circuit, Vs: Pressure control valve, M: Injection molding machine, Mi: Injection device, Ep: Deviation, Rd: Rotation number detection value

CITATION LIST

Patent Literature 1
 Japanese Patent Number 2665815

Patent Literature 2
 JP-A-H07-110078

The invention claimed is:

1. A hydraulic drive device for an injection molding machine that has a pressure control valve incorporating a pressure sensor for detecting a hydraulic pressure and a first feedback control circuit for controlling the hydraulic pressure by feedback based on a pressure detection value obtained from the pressure sensor and a pressure instruction value fed from a molding machine controller,
 wherein the molding machine controller comprises a second feedback control circuit for correcting the pressure instruction value serving as an output instruction value that is fed to the pressure control valve based on the pressure detection value fed from the pressure control valve and the pressure instruction value serving as a formal instruction value obtained from an interior of the molding machine controller.

2. The hydraulic drive device for an injection molding machine according to claim 1,
 wherein the hydraulic pressure is a back pressure that is produced in a rear oil compartment of an injection cylinder when a screw in an injection device is moved backward.

3. The hydraulic drive device for an injection molding machine according to claim 1,
 wherein the pressure control valve comprises a valve mechanism portion constituting a control valve including a valve body and an electromagnetic solenoid, the pressure sensor, a temperature sensor disposed in the pressure sensor itself or near the pressure sensor and a circuit box.

4. The hydraulic drive device for an injection molding machine according to claim 3,
 wherein the circuit box incorporates a signal processing portion, a computation portion and an amplification portion, and a minor-loop feedback control circuit is configured by connecting the pressure sensor and the temperature sensor to the signal processing portion.

5. The hydraulic drive device for an injection molding machine according to claim 3,
 wherein the pressure detection value is a pressure detection value that is corrected according to an oil temperature detected by the temperature sensor.

6. The hydraulic drive device for an injection molding machine according to claim 3,
 wherein the pressure sensor is screwed into an outside surface of the valve body and thus a pressure detecting surface formed in an end of the pressure sensor faces an oil passage provided inside the valve body.

7. The hydraulic drive device for an injection molding machine according to claim 2,
 wherein the pressure control valve has a separate connection port that is not connected to an inlet port and an outlet port for operation oil, the pressure sensor faces an oil passage communicating with the connection port and the connection port and the rear oil compartment of the injection cylinder are connected together.

8. The hydraulic drive device for an injection molding machine according to claim 1,
 wherein the second feedback control circuit has a correction function of determining a deviation between the pressure detection value and the formal instruction value and of obtaining the output instruction value by adding the deviation to the formal instruction value.

9. The hydraulic drive device for an injection molding machine according to claim 1, the hydraulic drive device further comprising:
 a hydraulic pump portion variably controlling a number of rotations of a drive motor to control at least a discharge flow.

10. The hydraulic drive device for an injection molding machine according to claim 9, the hydraulic drive device further comprising:
 an oil motor for rotating a screw; and
 an injection device having a rotary encoder for detecting a number of rotations of the oil motor,
 wherein the molding machine controller comprises a third feedback control circuit that variably controls the number of rotations of the drive motor based on the number of rotations detected by the rotary encoder and a preset rotation number set value.

* * * * *